T. W. HAND.
TIRE SLABBING AND PUNCHING PRESS.
APPLICATION FILED APR. 15, 1920.

1,387,260.

Patented Aug. 9, 1921.
8 SHEETS—SHEET 1.

Witnesses
Henry Ruhl
Belle K. Solomon

Inventor
Thomas Wilton Hand
by Bresey Wehrenk
Attorneys

T. W. HAND.
TIRE SLABBING AND PUNCHING PRESS.
APPLICATION FILED APR. 15, 1920.

1,387,260.

Patented Aug. 9, 1921.
8 SHEETS—SHEET 2.

T. W. HAND.
TIRE SLABBING AND PUNCHING PRESS.
APPLICATION FILED APR. 15, 1920.

1,387,260.

Patented Aug. 9, 1921.
8 SHEETS—SHEET 4.

T. W. HAND.
TIRE SLABBING AND PUNCHING PRESS.
APPLICATION FILED APR. 15, 1920.

1,387,260.

Patented Aug. 9, 1921.
8 SHEETS—SHEET 7.

T. W. HAND.
TIRE SLABBING AND PUNCHING PRESS.
APPLICATION FILED APR. 15, 1920.

1,387,260.

Patented Aug. 9, 1921.
8 SHEETS—SHEET 8.

UNITED STATES PATENT OFFICE.

THOMAS WILTON HAND, OF SHEFFIELD, ENGLAND, ASSIGNOR TO DAVY BROTHERS, LIMITED, OF SHEFFIELD, ENGLAND.

TIRE SLABBING AND PUNCHING PRESS.

1,387,260.  Specification of Letters Patent.  Patented Aug. 9, 1921.

Application filed April 15, 1920.  Serial No. 374,190.

*To all whom it may concern:*

Be it known that I, THOMAS WILTON HAND, a subject of the King of Great Britain, of Park Iron Works, Sheffield, England, engineer, have invented certain new and useful Improvements in Tire Slabbing and Punching Presses, of which the following is a specification.

This invention relates to tire slabbing and punching presses, that is to say, hydraulic or other forging presses for producing metal tire blanks or slabs by flattening hot ingots to disk-like shape under vertically-applied pressure upon an anvil and for punching out the central portion of each such blank so as to convert the disk into an annulus, in preparation for the rolling operation whereby the blank is brought to the rough configuration and dimensions of the tire before being finished in the lathe. The invention constitutes improvements in presses of this kind comprising a bed-plate which supports a horizontally-movable slide carrying both an anvil on which the flattening of the ingot is effected and also a punch-block or blocks to which the flattened blank is transferred and on which the punching operation is performed or completed, the slide being moved to and fro as required for the purpose of bringing alternatively the anvil and one or other of the punch-blocks into operative position; means for causing the anvil to be rotated about its vertical axis so as to enable blanks to be dealt with whose area is greater than can be effectually forged by a top tool covering the entire surface; means for so supporting the upper punch as to render it capable of being swung by a horizontal angular movement into and out of operative position; and a so-called manipulator constituted by a hydraulically-actuated leverage-system serving to control pairs of gripping-jaws for centering the blank in the press and for lifting the blank and holding it raised in centered position, clear of the slide, during the movement of the latter in the intervals between certain stages of the forging operation.

In constructions already known or proposed the manipulator just referred to has been mounted on the base-plate of the press, most of the working parts of both the manipulator and the anvil-revolving mechanism being in consequence situated either below floor-level or in such positions as to be not only difficult of access but also subject to damage owing to the accumulation of scale from forgings etc. According to the present invention, not the flattening-anvil but the top tool is made rotatable, while the gripping-jaws of the manipulator are mounted not upon the bed-plate but upon the presshead, so that the disadvantage just mentioned is avoided. Moreover, as the gripping-jaws participate in the vertical movements of the presshead, the manipulator-mechanism is relieved of the duty of lifting the weight of the blank, the lifting action being by the invention obtained by utilizing the upward movements of the presshead between its operative strokes so that the work, when seized by the gripping-jaws, is automatically raised as the presshead ascends.

Owing to the thickness of the blank, the taper required in the punch in order that it may be readily withdrawn from the work, and the advisability of making the tapers at both ends of the punched hole similar or nearly so, it is the practice to employ two punches, one acting downward and the other upward, and each serving to produce only part of the total depth of the hole in the blank. In the method heretofore followed, only the upper punch was swung into and out of operative position, the lower punch being a fixture on a punch-block, while the external diameter of the blank was allowed to increase to an indefinite extent under the action of the forging or punching tool or tools, and the periphery of the blank was not given any special shape.

For the purpose of the present invention, both punches may be so supported as to be capable of being swung horizontally into and out of position, and during the final punching and flattening operations the blank may be supported and inclosed peripherally by a die-block having an internal diameter and profile corresponding to the required external diameter and edge-profile of the blank. Inasmuch as the radial pressure (due partly to the finishing strokes of the top tool whereby the blank is brought finally to the required thickness, and partly to the action of the punch) produces such an increase in the external diameter of the blank that the periphery of the blank is forced against the surrounding die-block, the result of these operations is that the blank is brought to substantially the external diameter required, and is at the same time given the desired cross-sectional shape. The blank, thus caused to fill the cavity of the die-block exactly, may thereafter be forced out of the die-block by means of an ejector in the form of a concentric tubular plunger adapted to permit the escape of the falling scrap-diaphragm when the latter is thrust out from the center of the blank by the action of the top punch; the tubular ejector being raised when required by means of a pair of power-actuated ejector-blades fitted to work in vertical guides so as to be adapted to engage the ejector at opposite sides thereof.

In the accompanying drawings, which illustrate one form of the invention:—

Figure 1:
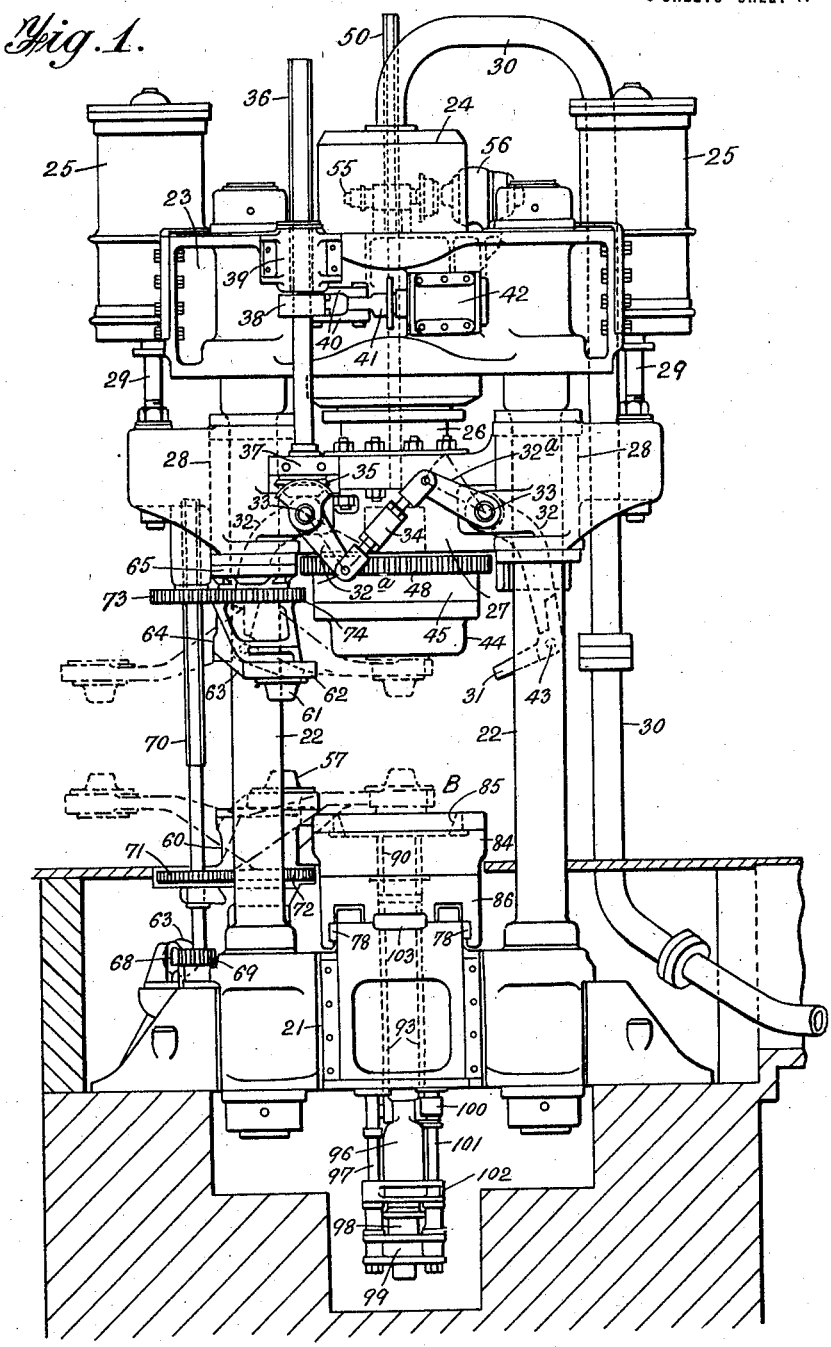
Figures 1 and 2 are side and end elevations of the press as viewed respectively in, and transversely of, the direction in which the horizontally-movable slide, carrying the anvil and die-block, is reciprocated.
Figure 2:
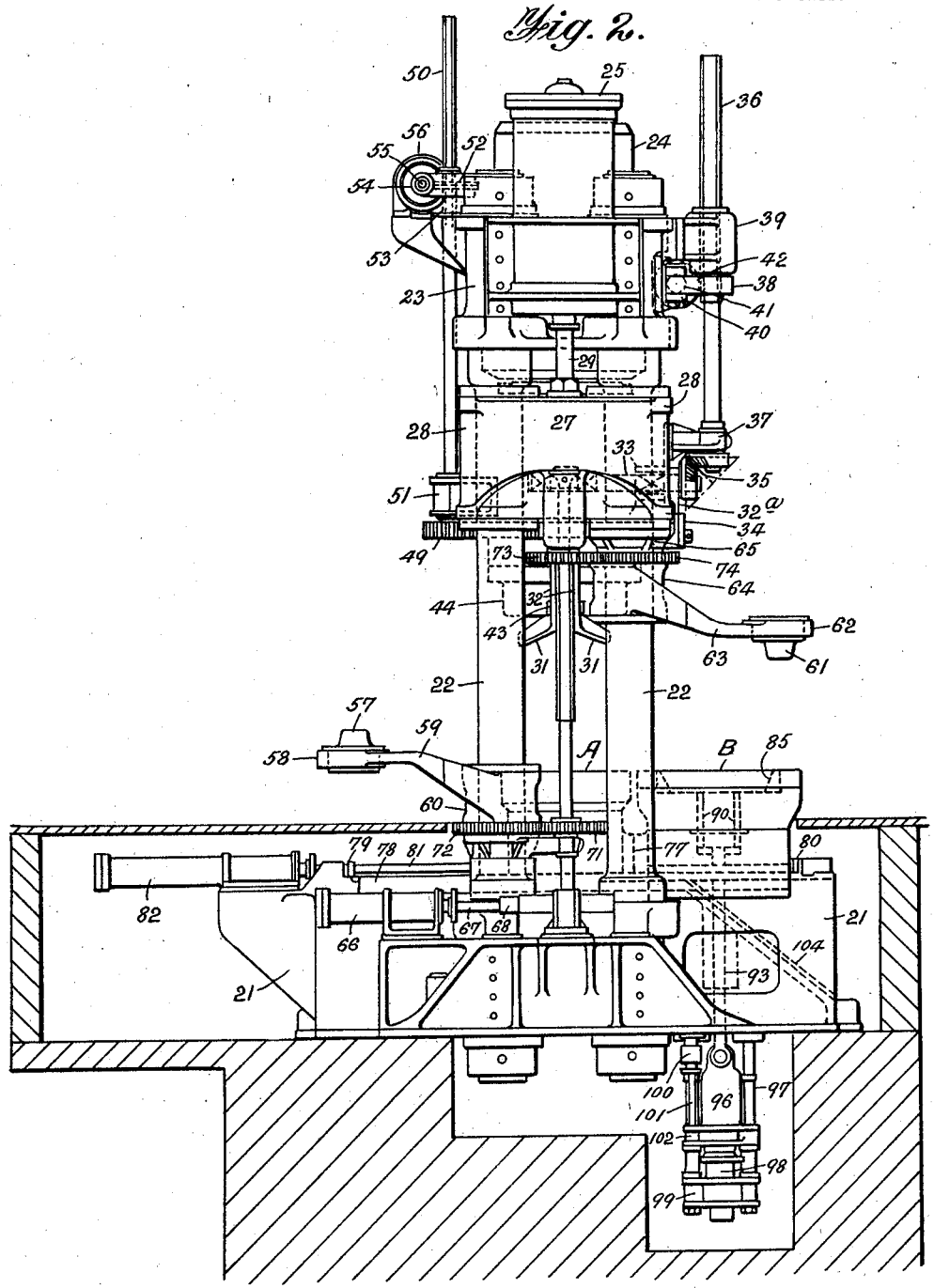
Figure 5:
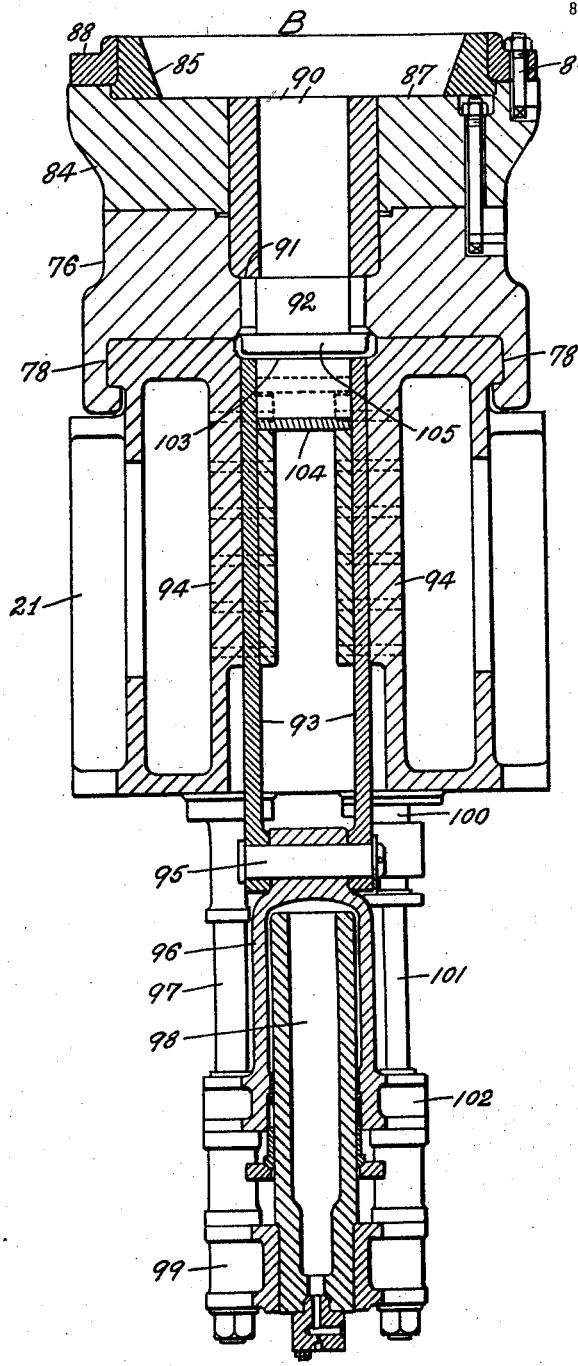
Figure 6:
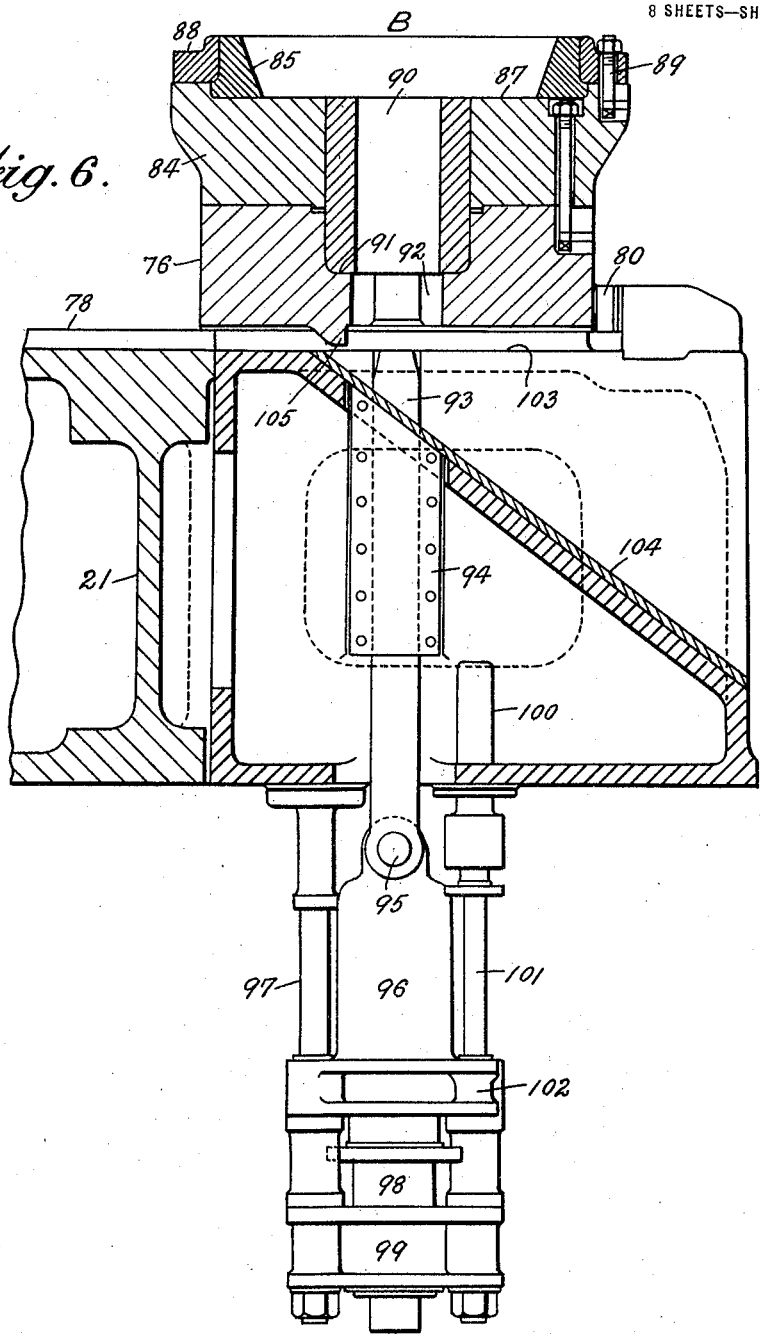
Figure 7:
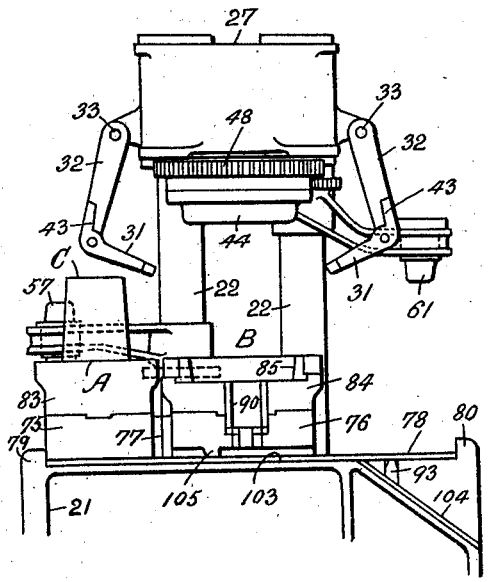
Figure 8:
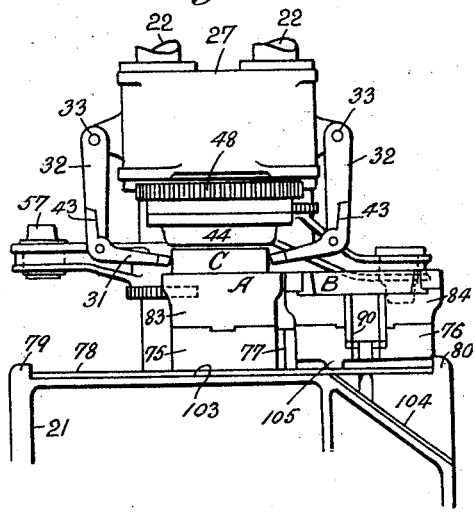

Figs. 5 and 6 are axial sections of the die-block and ejector-mechanism, viewed respectively in the same directions as Figs. 1 and 2; and Figs. 7 to 14 inclusive are a series of eight elementary or diagrammatic, and partly sectional, elevations each embodying a portion of what is contained in Fig. 2, designed to illustrate various stages in the operation of producing a blank; the gripping-jaws of the manipulator being shown as working in a plane at right angles to that wherein they actually move in practice.

Similar reference symbols denote corresponding parts throughout the drawings.

21 is the bed-plate of the press; 22 are the four vertical columns rising from the bed-plate and supporting the entablature 23, which carries centrally the main hydraulic cylinder 24 and at the ends the two lifting cylinders 25, the latter being assumed to be adapted for working by steam. In the main hydraulic cylinder 24, the forging ram 26 performs its working stroke vertically downward, the lower end of the ram being attached to the presshead 27 which is provided at 28 with sliding bearings fitted to reciprocate on the pillars 22, while the vertically-working pistons (not shown) of the lifting cylinders 25 are attached to the presshead 27 by piston-rods 29. The steam connections to the lifting cylinders 25 are omitted in the drawings, wherein however 30 (omitted in Fig. 2) is the hydraulic main pipe leading from a suitable source of hydraulic pressure (such for example as a steam hydraulic intensifier, not shown) to the upper end of the main hydraulic cylinder 24. All the above mentioned parts are constructed and arranged substantially as usual in hydraulic forging presses of the type to which the invention is shown as applied.

The gripping-jaws 31 of the manipulator-mechanism are carried by the downwardly-directed ends of two pairs of levers 32 dependent from fulcrum-shafts 33 journaled in bearings on the press-head 27; arms 32ª on the shafts 33 being so coupled together by an adjustable link 34 that the jaws 31 of each pair move toward or from one another simultaneously. One of the fulcrum-shafts 33 is rotated, to actuate the levers 32, by bevel gearing 35 from a vertical shaft 36 adapted to slide lengthwise up and down as one with the presshead 27; this vertical shaft, which is journaled in a bearing 37 on the presshead, having a splined engagement with the hub of a lever 38 whereof the hub is angularly movable in a stationary bearing 39 on the entablature 23 of the press, while the lever 38 itself is coupled by a pair of links 40 to the piston-rod 41 of a double-acting hydraulic cylinder 42 mounted on the entablature 23 and supplied with hydraulic pressure (by means not shown) under the control of the press-operator. The gripping-jaws 31 are not integral with the levers 32 which carry them, but are constituted by pairs of inwardly and downwardly convergent extensions of fingers hinged to the levers by knuckle-joints 43 which permit of the points of the fingers moving upward in the event of their encountering the work during the descent of the presshead 27, when the gripping mechanism is not in actual use.

Figure 4:
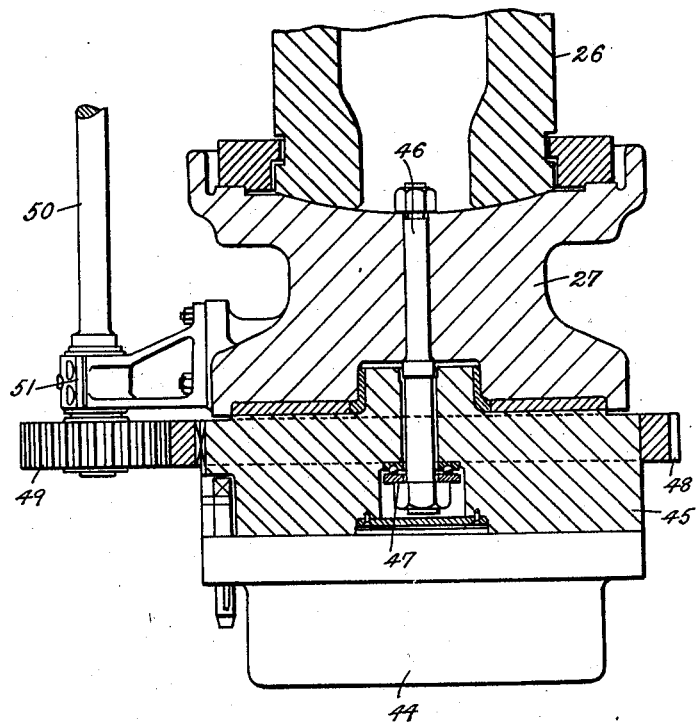
Fig. 4 is an axial section of the rotatable holder for the top-tool of the press, with the immediately associated parts, drawn to a larger scale.

The top tool 44, with its holder 45, is rotatable relatively to the presshead 27 from which it is suspended by an axial bolt 46 and ball bearing 47 as shown in Fig. 4. The top tool 44 is revolved by means of a horizontal ring of teeth 48 fixed to the tool-holder 45 and constantly in mesh with a pinion 49 fast on the lower end of a vertical shaft 50 which is journaled in a bearing 51 on the presshead, this shaft having a splined engagement with a worm wheel 52 rotatable in a stationary bearing 53 on the entablature 23 of the press, while the worm wheel 52 meshes with a worm 54 on the armature shaft 55 of an electric motor 56 mounted on the entablature and supplied with current (by means not shown) under the control of the press-operator.

The bottom punch 57 is mounted, so as to be changeable when necessary, in a socket 58 on the end of an arm 59 extending from a hub 60 fitted to turn about one of the vertical cylindrical pillars 22 of the press; while the top punch 61 is also changeably mounted in a socket 62 on the end of a similar arm 63 which extend from a hub 64 fitted to turn about a bearing 65 carried by the press-head 27 and surrounding the adjacent vertical pillar 22 at the same end of the press; the top punch 61 thus participating in the vertical movement of the press-head, whereas the bottom punch 57 has no vertical motion. The swinging movement of the punch-carrying arms 59 and 63 is produced as required, by means of a double acting hydraulic piston working in a horizontal cylinder 66 mounted on the bed-plate 21 of the press and supplied with hydraulic pressure (by means not shown) under the control of the press-operator; the hydraulic piston-rod 67 being provided with a rack 68 which gears with a pinion 69 fast on the lower end of a vertical shaft 70 extending between those two pillars 22 of the press which have just been mentioned. This vertical shaft 70 has, fast on its lower end, a spur wheel 71 which gears with a spur wheel 72 on the hub 60 of the lower punch-carrying arm 59, and has also a splined connection with one (viz:—73) of a pair of mutually-engaged spur wheels 73, 74 which are mounted to move vertically with the presshead 27 and whereof the other wheel 74 is on the hub 64 of the upper punch-carrying arm 63.

Figure 3:
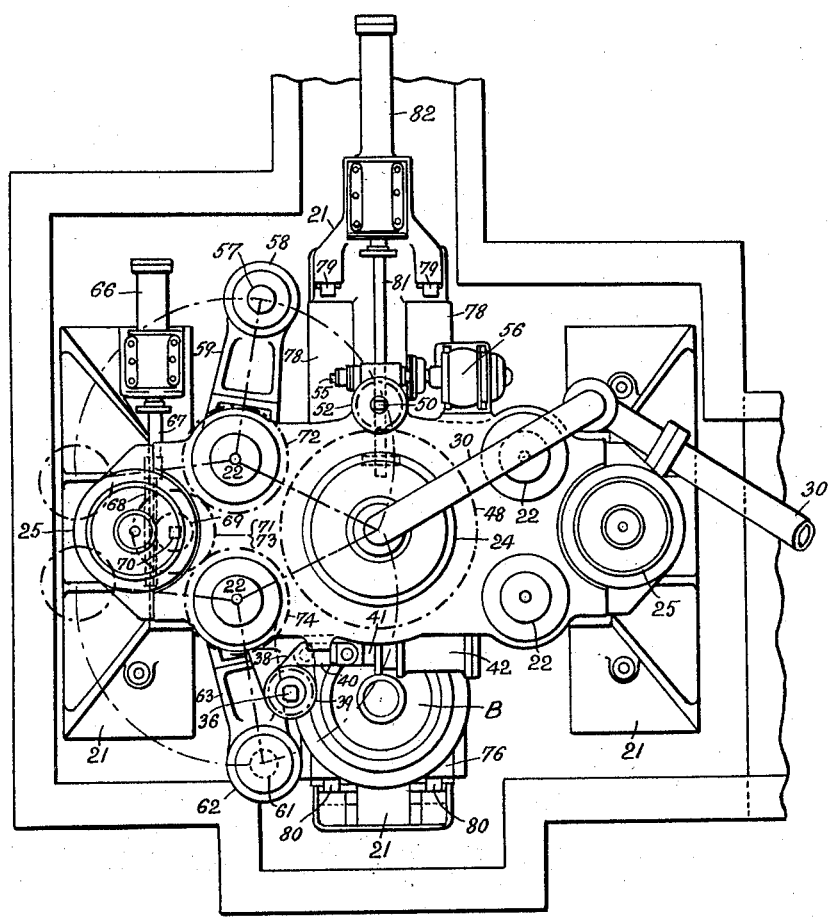
Fig. 3 is a plan view of the same.

The arms 59 and 63 are disposed in such angular relation to one another, about their respective axes of rotation on the pillars 22 whereon they are both rotatable, that whereas on the one hand, when both punches 57 and 61 are out of operation (as in the positions shown in full lines in Figs. 1 and 3) both arms 59 and 63 extend clear of the work, on the other hand, when the vertical shaft 70 is rotated in the one or the other direction so as to bring the one or the other punch 57 or 61 into operative position centrally beneath the press, that punch 61 or 57 which is not then required will be moved still farther away from operative position. These movements can be readily followed on reference to the plan view of the press, Fig. 3.

The anvil A and die-block B, in the example illustrated each comprise a base carrying an upper portion which is capable of being changed to suit the nature of the work. The base 75 of the anvil A and the base 76 of the die-block B are bolted together at 77 so as to constitute in effect a single slide which is movable to-and-fro upon horizontal guides 78 provided on the bed-plate 21; such movement being so limited by stops 79 and 80 that, according as the slide is in the one or the other of its limit-positions, the anvil A or the die-block B will be presented in proper position beneath the main press cylinder 24. For the purpose of effecting the to-and-from movement as required, the base 75 of the anvil A has attached to it the piston-rod 81 of a double-acting hydraulic cylinder 82 which is mounted upon the bed-plate 21 and supplied with hydraulic pressure (by means not shown) under the control of the press-operator.

The detachable upper portion 83 of the anvil A may consist as usual of an anvil-block having a flat upper surface, whereas the detachable upper portion of the die-block B consists of a block 84 carrying the die proper. This latter comprises an upwardly-flared profiling-ring 85 having an outwardly-projecting bottom-flange 86 whereby the profiling-ring is removably secured, in a seating recessed in the upper surface of the block 84, by means of a detachable washer-ring 88 bolted as at 89 to the block, while within the area bounded by the profiling-ring, the upper surface 87 of the block 84 is made flat to receive the blank. The profiling-ring 85 is made removable so as to permit of rings of different internal diameter being used to give the desired cross-sectional profile to blanks of different external diameters varying between somewhat wide limits within the capacity of the same press and die-block.

The ejector forming part of the present invention and serving to effect the ejection of the finished blank from the die-block, comprises (see Figs. 5, 6 and 14) an upright, open-ended, tubular plunger 90 fitted to slide vertically in a concentric aperture traversing the depth of the block 84 and part of the depth of the base 76; the lower end of the tubular plunger resting on a footstep 91 surrounding a downward continuation 92 of the central aperture while the upper extremity of the plunger normally stands flush with the upper surface 87 of the block 84; while the internal diameter of the tubular plunger is, or may be, greater than the maximum diameter of the scrap-diaphragm to be punched from the middle of the blank.

The raising of the tubular plunger 90 from its normal position, so as to cause the blank to be ejected from the die-block, is effected by means of a pair of upright parallel blades 93 fitted to slide lengthwise through vertical guides 94 in the bed-plate 21; the blades 93 being attached by their lower ends at 95 to the upper (closed) end of an inverted hydraulic cylinder 96. This cylinder, which is adapted to reciprocate vertically on pillars 97 beneath the bed-plate 21, is caused to perform its upward strokes, when required, by the admission of hydraulic pressure to its interior, the coacting hydraulic ram 98 being held stationary by its attachment to a crosshead 99 at the lower ends of the pillars 97; while the downward or return strokes of the cylinder 96 are brought about by the admission of hydraulic pressure to a small stationary hydraulic cylinder 100 whereof the vertically-working ram 101 is attached to a crosshead 102 which serves to guide the lower end of the cylinder 96 on the pillars 97.

The ejector-blades 93, which are normally retracted so that their upper extremities do not project above the level of the upper surface 103 of the bed-plate 21 (see Figs. 5 and 6), are spaced apart at a distance greater than the diameter of the largest top-punch 61 with which the die-block is required to coöperate, and, as viewed in plan, are included externally within a circle having a diameter less than that of the smallest blank with which the apparatus is called upon to deal. The tubular ejector-plunger 90 is made of corresponding dimensions as viewed in plan, so that the blades 93, when thrust upward to lift the finished blank out of the die-block, can never fail to engage the tubular plunger 90 and the latter, as it rises, can never fail to engage the blank, however small its external diameter or however large the central aperture punched in it, having regard to the limits of the particular apparatus.

Within the bed-plate 21, and between the ejector-blade guides therein, an inclined chute 104 is mounted in position to receive the scrap-diaphragm when the latter, after being punched from the middle of the blank, is swept into the chute as hereinafter explained, the chute 104 being adapted to lead the scrap-diaphragm, clear of the ejector actuating-mechanism, to some convenient point outside the apparatus. In the example illustrated the base 76 of the die-block B stands clear of that upper surface 103 of the bed-plate 21 over which the slide 75, 76 carrying the anvil A and the die-block B is movable to-and-fro, the clearance being sufficient to accommodate the thickest scrap-diaphragm when resting on the surface 103 of the bed-plate whereon it drops from the blank; while the base 76 of the die-block is provided with a downward projection 105 adapted, as the die-block B is moved into position over the ejector-actuating mechanism, to sweep the scrap-diaphragm along the surface 103 of the bed-plate whereon it has fallen, and thus to deliver the scrap-diaphragm on to the chute 104.

Figure 9:
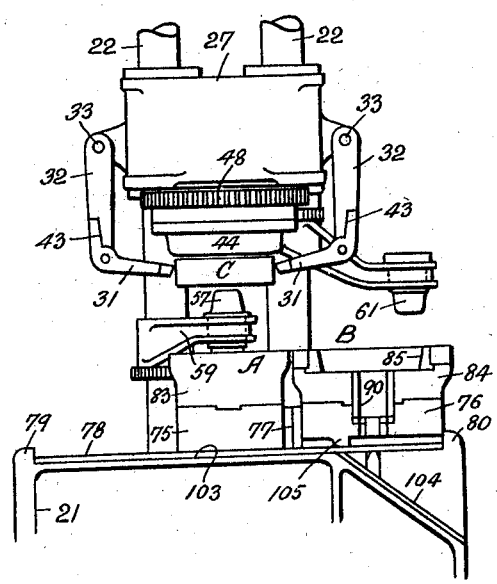
Figure 10:
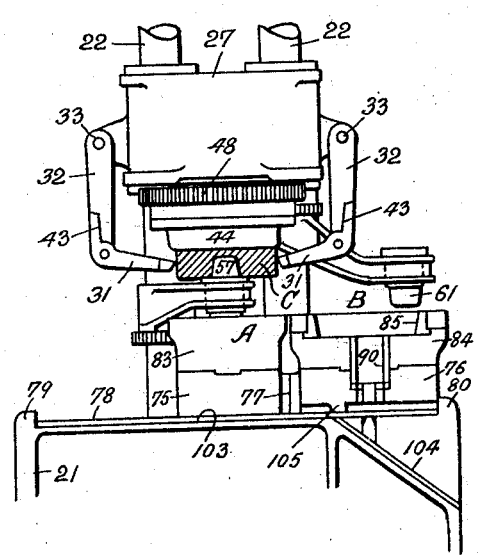
Figure 11:
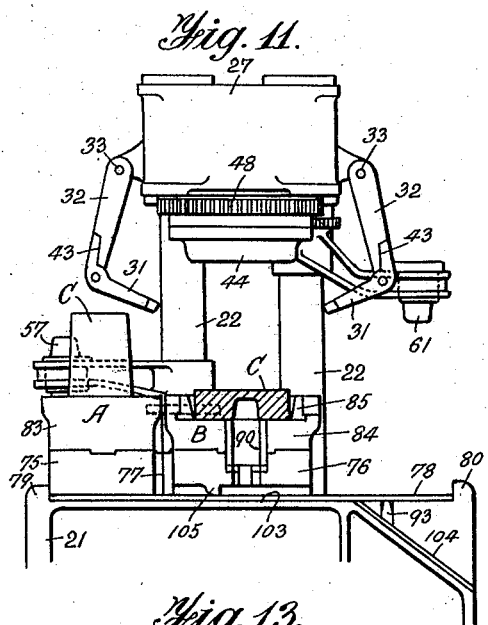
Figure 12:
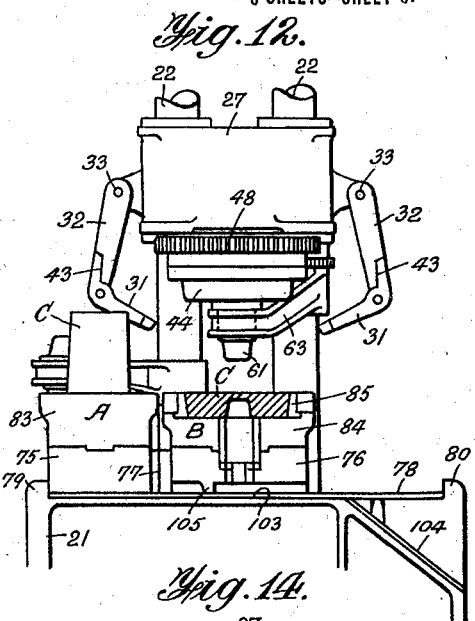
Figure 13:
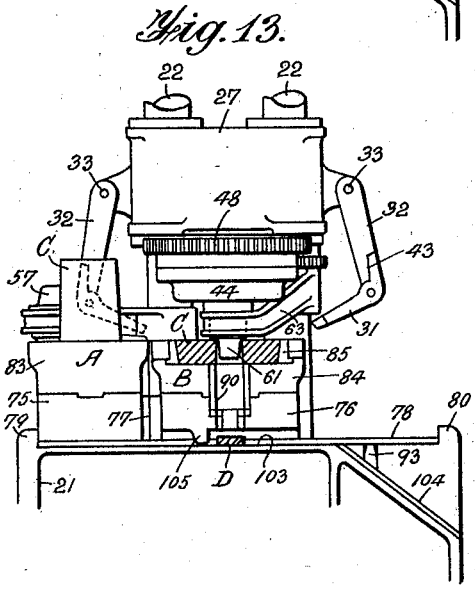
Figure 14:
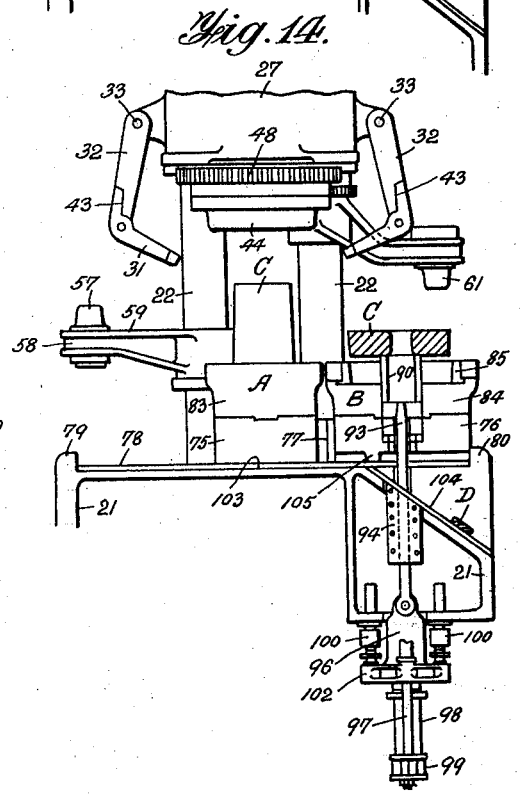

The slabbing and punching operation as a whole is performed as follows (see Figs. 7 to 14). The slide 75, 76 having been brought to such position on the base-plate that the flattening anvil A is withdrawn from beneath the top tool 44, the ingot C is placed end-upward concentrically upon the anvil block 83 (Fig. 7) which is then brought directly beneath the top tool. The presshead 27 is thereupon lowered, and forced downward so that the top tool 44 flattens the ingot C until the latter is brought to the form, approximately, of a disk having rather more than the thickness ultimately required in the blank. The top tool 44 being as usual rectangular, and only the length of its face being equal to the maximum diameter of the blank when flattened, a blank whose diameter is greater than the width of the tool-face is forged by rotating the top tool through a suitable angle between successive blows of the press, so that all parts of the area of the blank are eventually reduced to the required thickness. The gripping-jaws 31 of the manipulator are then caused (see Fig. 8) to grasp the disk-like blank C, and the presshead 27 being thereupon raised, the blank is lifted from the anvil (see Fig. 9). The bottom punch 57 is thereupon swung into operative position over the anvil A, the lower end or base of the punch being at such a level as just to clear the upper surface of the anvil sufficiently to permit of this as indicated in Fig. 9. With the blank C still held in the gripping-jaws 31, the presshead 27 is now lowered, and forced downward so that the bottom punch 57 penetrates the blank from beneath to the predetermined depth (see Fig. 10); the resulting diametrical expansion of the blank being permitted by the yielding of the hydraulically-actuated manipulator. The presshead 27 is again raised while the gripping-jaws 31 retain their hold of the blank, which is thus withdrawn from the bottom punch 57 so that the latter can be afterward swung out of operative position. The slide 75, 76 is now moved so as to withdraw the anvil A from operative position and bring the die-block B concentrically beneath the top-tool 44; whereupon the blank C is released by the gripping-jaws 31 and dropped into the die-block B (see Fig. 11). At the same time a fresh ingot may be placed upon the anvil A. The top punch 61 is now swung into operative position beneath the top tool 44, the upper end or base of the punch being at such a level as just to clear the undersurface of the tool sufficiently to permit of this (see Fig. 12). The presshead 27 being lowered, the top punch 61 descends with it and is forced into the blank C (see Fig. 13), thus severing the scrap-diaphragm D, which drops through the tubular ejector 90 while the action of the top punch 61 and the subsequent final flattening by means of the top tool 44 has for effect to cause the blank to expand radially until it exactly fills the die-block, as indicated by anticipation in Fig. 13. The scrap-diaphragm D will remain lying upon the level upper surface 103 of the bed-plate 21 until the transference of the die-block B from beneath the top tool 44 to above the ejector-actuating mechanism, when the scrap-diaphragm will be swept by the projection 105 to, and will escape by way of, the inclined chute 104. On the ejector 90 being subsequently raised by the blades 93, the blank C will be lifted out of the die-block B ready for removal. (See Fig. 14).

Having now particularly fully described and ascertained my said invention, and the manner in which it is to be performed, I declare that what I claim is:—

1. A tire slabbing and punching press of the kind referred to comprising means for supporting the blank, a press-head and a top tool carried by and rotatable relatively to said press-head substantially as and for the purpose set forth.

2. A tire slabbing and punching press of the kind referred to comprising a bed plate, a flattening anvil mounted thereon and arranged to receive the blank, a reciprocable press-head, gripping jaws mounted upon said press-head for lifting the blank from the flattening anvil and manipulator mechanism for operating said jaws substantially as and for the purpose set forth.

3. A tire slabbing and punching press comprising means for supporting the blank, an upper punch and a lower punch capable of being swung horizontally into and out of operative positions relatively to said blank, means for coördinating the swinging movements of said punches so that when either of them is in operative position the other is out of such position, and a press-head whereby said punches are rendered effective upon said blank substantially as set forth.

4. In a tire slabbing and punching press the combination with means for flattening and punching a blank and means including a die-block whereby the blank may be supported and inclosed peripherally during the final punching and flattening operations to give said blank the required external diameter and edge profile, of a tubular ejector for lifting the finished blank out of the die-block, said ejector being adapted to permit the escape of the scrap-diaphragm punched from the blank substantially as set forth.

5. In a tire slabbing and punching press the combination with means for flattening and punching a blank and means including a die-block whereby the blank may be supported and inclosed peripherally during the final punching and flattening operations to give said blank the required external diameter and edge profile, of a tubular ejector adapted to be raised from normal position to lift the blank out of the die-block, vertical guides and a pair of power actuated ejector blades fitted to work in said vertical guides and adapted to engage the tubular ejector at opposite sides thereof to raise the same substantially as set forth.

6. A tire slabbing and punching press comprising a vertically movable press-head, a top tool carried by and rotatable relatively to said press-head, means for supporting the blank, gripping jaws mounted upon said press-head for lifting the blank from said supporting means and manipulator mechanism for operating said jaws, an upper punch and a lower punch capable of being swung horizontally into and out of operative positions and means for coördinating the swinging movements of said punches so that when either of them is in operative position the other is out of such position.

7. A tire slabbing and punching press comprising means for supporting the blank, a movable press-head, means carried by the latter and partaking of the movements thereof whereby said blank is removed from said supporting means and mechanism for operating said blank removing means relatively to said press-head.

THOMAS WILTON HAND.

Witness:
REGINALD WEBSTER.